United States Patent
Ebato

(10) Patent No.: US 8,396,351 B2
(45) Date of Patent: Mar. 12, 2013

(54) INFORMATION PROCESSING APPARATUS, INFORMATION PROCESSING METHOD, INFORMATION PROCESSING PROGRAM AND IMAGING APPARATUS

(75) Inventor: Satoshi Ebato, Tokyo (JP)

(73) Assignee: Sony Corporation, Tokyo (JP)

( * ) Notice: Subject to any disclaimer, the term of this patent is extended or adjusted under 35 U.S.C. 154(b) by 454 days.

(21) Appl. No.: 12/615,677

(22) Filed: Nov. 10, 2009

(65) Prior Publication Data

US 2010/0254676 A1 Oct. 7, 2010

(30) Foreign Application Priority Data

Nov. 12, 2008 (JP) .................................. 2008-290175

(51) Int. Cl.
*H04N 9/80* (2006.01)
(52) U.S. Cl. .................... 386/248; 386/241; 386/239
(58) Field of Classification Search .................. None
See application file for complete search history.

(56) References Cited

U.S. PATENT DOCUMENTS

| | | | | |
|---|---|---|---|---|
| 2007/0282472 | A1* | 12/2007 | Seldman ........................ | 700/94 |
| 2008/0019667 | A1* | 1/2008 | Uehara ........................... | 386/96 |
| 2009/0018898 | A1* | 1/2009 | Genen ............................ | 705/10 |
| 2009/0089354 | A1* | 4/2009 | Kim et al. ..................... | 709/201 |

FOREIGN PATENT DOCUMENTS

| | | |
|---|---|---|
| JP | 2004-221666 A | 8/2004 |
| JP | 2005-51706 A | 2/2005 |
| JP | 2005-184617 A | 7/2005 |
| JP | 2006-86621 | 3/2006 |
| JP | 2006-189977 | 7/2006 |
| JP | 2007-82088 A | 3/2007 |
| JP | 2007-282118 | 10/2007 |
| JP | 2007-282119 | 10/2007 |
| JP | 2007-317353 | 12/2007 |
| JP | 2008-147901 A | 6/2008 |
| JP | 2008-178090 A | 7/2008 |

OTHER PUBLICATIONS

Japanese Office Action dated Oct. 19, 2010 in corresponding Japanese Application No. 2008-290175.

* cited by examiner

*Primary Examiner* — William C Vaughn, Jr.
*Assistant Examiner* — Eileen Adams
(74) *Attorney, Agent, or Firm* — Oblon, Spivak, McClelland, Maier & Neustadt, L.L.P.

(57) ABSTRACT

An apparatus includes a storage unit that stores object metadata created by associating object present time information indicating a time when an object is present in video of audio/video data with object identification information to identify the object, music metadata containing music present time information indicating the time when music is present in audio of the audio/video data, and object BGM correspondence information created by associating the object identification information with BGM identification information and a control unit that determines whether any time in the audio/video data satisfying conditions that the time matches a time indicated by the object present time information and does not match a time indicated by the music present time information is present and outputs BGM identified by the BGM identification information associated with the object identification information associated with the object present time information when reproduction advances to the time concerned.

10 Claims, 12 Drawing Sheets

INFORMATION PROCESSING APPARATUS, INFORMATION PROCESSING METHOD, INFORMATION PROCESSING PROGRAM AND IMAGING APPARATUS

BACKGROUND OF THE INVENTION

1. Field of the Invention

The present invention relates to an information processing apparatus, an information processing method, an information processing program and an imaging apparatus.

2. Description of the Related Art

In recent years, home video cameras are more widely used in general for recording child's growth or shooting events such as trips. However, if video data is left without editing video materials (video data obtained by shooting), information other than the video data does not remain. Thus, if a certain time or more passes after video data being shot, there is an issue that redundant video data is left over as it is without a function to save memories when shot being sufficiently fulfilled and also viewing the video becomes boring. While editing work of video data is necessary to solve such an issue, doing editing work is extravagant and troublesome because it is necessary to use a plurality of video apparatuses and a special effector or a PC (Personal Computer). Thus, various technologies are proposed to reduce workloads.

For example, a nonlinear editing technology in which video materials are rearranged when the video materials are dragged and dropped onto a time line by the user or automatically is proposed (see Japanese Patent Application Laid-Open No. 2007-317353).

Also, a technology to create play list content with BGM (BackGround Music) of still images is disclosed (see Japanese Patent Application Laid-Open No. 2006-86621). Further, a technology to divide image data into album data for each person based on person identification of still images is proposed (see Japanese Patent Application Laid-Open No. 2006-189977).

Also, a technology (effect) to decorate still images is proposed (see Japanese Patent Application Laid-Open Nos. 2007-282118 and 2007-282119). In this technology, a technology to perform image processing on a still image or add data based on face recognition results of the still image is proposed.

SUMMARY OF THE INVENTION

However, processes such as the capture of video data, time-line editing, authoring, and recoding output are necessary to do editing work of video data and thus, there is an issue that editing work of video data is technically difficult for general users. There is also an issue that a lot of time and effort is necessary for general users because it takes a long time to do editing work. Particularly, there is an issue that time and effort to time a sound effect or BGM to video data will be huge because there is no effective technology to add a sound effect or BGM to video data.

The present invention has been made in view of the above issues and there is a need to provide a novel and improved technology capable of easily generating data necessary for outputting BGM fitted to video data.

According to an embodiment of the present invention, there is provided an information processing apparatus including a storage unit that stores object metadata created by associating object present time information indicating a time when an object is present in video of audio/video data with object identification information to identify the object, music metadata containing music present time information indicating the time when music is present in audio of the audio/video data, and object BGM correspondence information created by associating the object identification information with BGM identification information and a control unit that determines whether any time in the audio/video data satisfying conditions that the time matches a time indicated by the object present time information and does not match a time indicated by the music present time information is present and, if the time satisfying the conditions is present, outputs BGM identified by the BGM identification information associated with the object identification information associated with the object present time information when reproduction advances to the time concerned.

The storage unit may further store the audio/video data. The information processing apparatus further may include a BGM data storage unit that stores BGM data, a reproducing unit that reproduces the audio/video data stored in the storage unit, a separation unit that obtains audio data and video data by separating the audio/video data reproduced by the reproducing unit, an audio synthesis unit that obtains synthetic audio data by synthesizing the BGM data identified by the BGM identification information and the audio data obtained by the separation unit when the reproduction advances to the time decided by the control unit to output the BGM, and an audio/video synthesis unit that obtains audio/video synthesis data by synthesizing the synthetic audio data obtained by the audio synthesis unit and the video data.

The control unit may include a BGM metadata generation unit that generates BGM metadata by associating BGM present time information indicating the time decided to output the BGM and the BGM identification information and causes the storage unit to store the BGM metadata.

The storage unit may further store the audio/video data. The information processing apparatus may further include a BGM data storage unit that stores BGM data, a reproducing unit that reproduces the audio/video data stored in the storage unit, a separation unit that obtains audio data and video data by separating the audio/video data reproduced by the reproducing unit, an audio synthesis unit that obtains synthetic audio data by synthesizing the BGM data identified by the BGM identification information and the audio data obtained by the separation unit when the reproduction advances to the time indicated by the BGM present time information of the BGM metadata stored in the storage unit and an audio/video synthesis unit that obtains audio/video synthesis data by synthesizing the synthetic audio data obtained by the audio synthesis unit and the video data.

The information processing apparatus may further include a video output unit that outputs video based on the video data contained in the audio/video synthesis data obtained by the audio/video synthesis unit and an audio output unit that outputs synthetic audio based on the synthetic audio data contained in the audio/video synthesis data obtained by the audio/video synthesis unit.

The information processing apparatus may further include an input unit capable of accepting input of instruction information not to synthesize the BGM data and the audio data from a user. The control unit may not cause the audio synthesis unit to synthesize the BGM data and the audio data when the input unit accepts the input of the instruction information from the user.

The control unit may cause the storage unit to store the audio/video synthesis data obtained by the audio/video synthesis unit.

According to the present invention, as described above, a technology of easily generating data necessary for outputting BGM fitted to video data can be provided.

DETAILED DESCRIPTION OF EMBODIMENT

Figure 1:
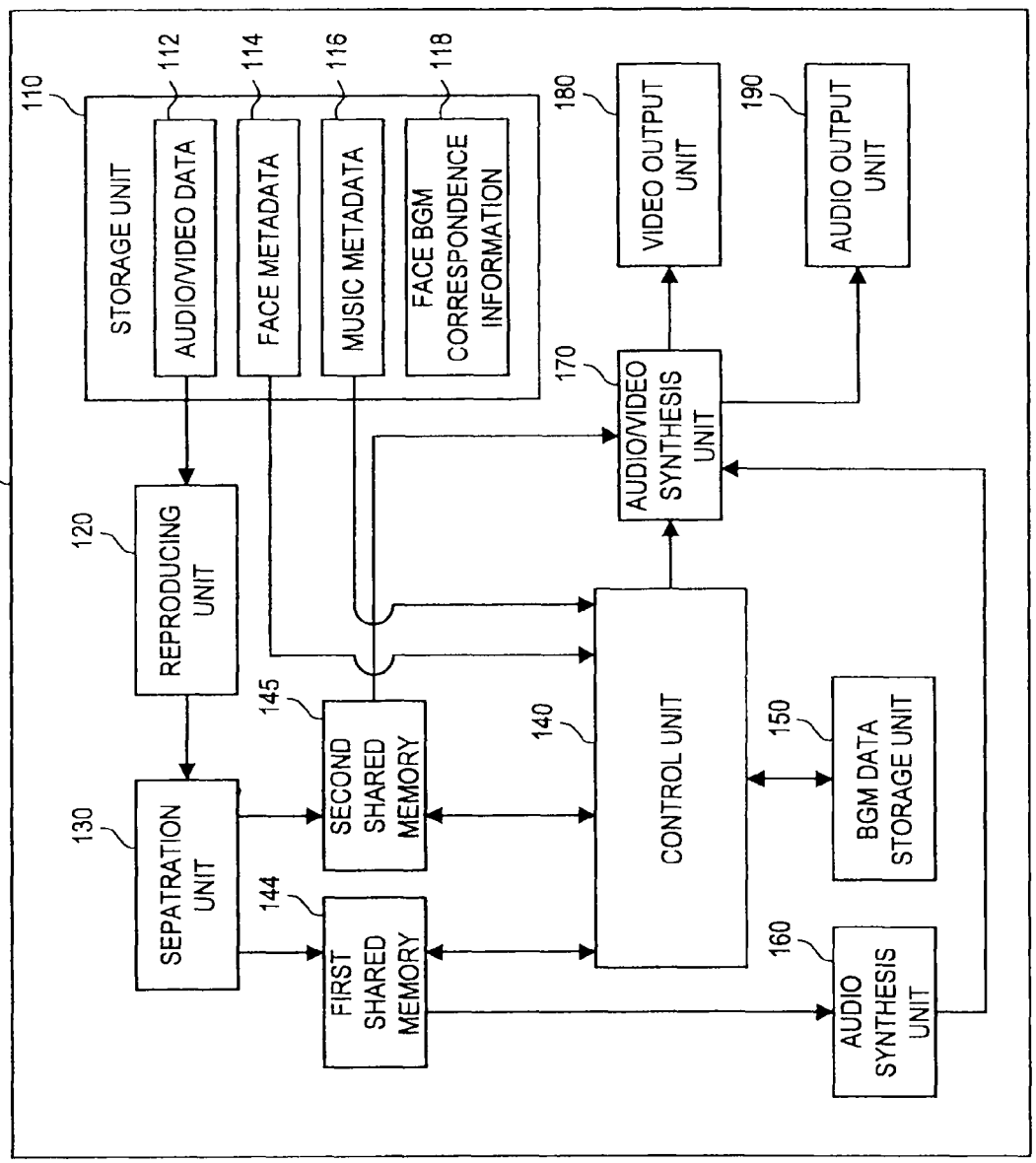
FIG. 1 is a block diagram showing the configuration of an information processing apparatus according to a first embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

1. First embodiment (hardware configuration of the information processing apparatus)
2. First embodiment (function of the information processing apparatus)
3. First embodiment (operation of the information processing apparatus)
4. Second embodiment (hardware configuration of the information processing apparatus)
5. Second embodiment (function of the control unit of the information processing apparatus)
6. Second embodiment (addition processing of BGM metadata)
7. Second embodiment (BGM added reproduction)
8. Third embodiment (hardware configuration of the imaging apparatus)
9. Fourth embodiment (hardware configuration of the imaging apparatus)
10. Recording technique of video data
11. Effects according to the embodiments
12. Modifications of the embodiments

1. First Embodiment (Hardware Configuration of the Information Processing Apparatus)

First, the hardware configuration of an information processing apparatus according to the first embodiment of the present invention will be described. FIG. 1 is a diagram showing the hardware configuration of an information processing apparatus according to the first embodiment. The hardware configuration of an information processing apparatus according to the first embodiment will be described below with reference to FIG. 1.

As shown in FIG. 1, an information processing apparatus 100 includes at least a storage unit 110 and a control unit 140. The storage unit 110 is an apparatus for storing data and includes, for example, a magnetic storage unit device such as an HDD (Hard Disk Drive), semiconductor device, optical storage device, and magneto-optical storage device. The storage unit 110 stores programs executed by the control unit 140 and various kinds of data.

The storage unit 110 stores face metadata 114 created by associating face present time information indicating a time when a face as an example of objects is present in video of audio/video data 112 and face identification information to identify the face. The storage unit 110 also stores music metadata 116 including music present time information indicating a time when music is present in audio of the audio/video data 112. Further, the storage unit 110 stores face BGM correspondence information 118 created by associating face identification information and BGM identification information. While the face of a human is used as an example of objects below, other objects than the face of a human can also be used and objects, for example, the face of an animal such as a pet, a portion of a human body, the entire human body, and a conveyance such as a vehicle can also be used.

The control unit 140 includes, for example, a CPU (Central Processing Unit), ROM (Read Only Memory) and RAM (Random Access Memory) and determines whether a time in audio/video data satisfying conditions that the time matches a time indicated by face present time information and does not match a time indicated by music present time information is present. If a time satisfying the conditions is present, the control unit 140 decides to output BGM identified by BGM identification information associated with face identification information associated with the face present time information when the reproduction advances to the time.

The storage unit 110 may further store the audio/video data 112 and the information processing apparatus 100 may further include a BGM data storage unit 150, a reproducing unit 120, a separation unit 130, an audio synthesis unit 160, and an audio/video synthesis unit 170.

The reproducing unit 120 reproduces the audio/video data 112 stored in the storage unit 110. The separation unit 130 separates the audio/video data 112 reproduced by the reproducing unit 120 to obtain audio data and video data. For example, the separation unit 130 causes a first shared memory 144 to store audio data and a second shared memory 145 to store video data. The BGM data storage unit 150 includes, for example, a ROM and stores BGM data. The BGM data storage unit 150 may also include, for example, a magnetic storage unit device such as an HDD, semiconductor device, optical storage device, or magneto-optical storage device. It is assumed here that the BGM data is stored in the BGM data storage unit 150, but may be stored in the storage unit 110.

When reproduction advances to the time when the control unit 140 decides to output BGM, the audio synthesis unit 160 obtains synthetic audio data by synthesizing BGM data identified by BGM identification information and audio data obtained by the separation unit 130. The audio synthesis unit 160 synthesizes, for example, audio data stored in the first shared memory 144 and BGM data stored in the first shared memory 144 after being read from the BGM data storage unit 150 by the control unit 140 to obtain synthetic audio data. The audio/video synthesis unit 170 obtains audio/video synthesis data by synthesizing synthetic audio data obtained by the audio synthesis unit 160 and video data. The audio/video synthesis unit 170 synthesizes, for example, synthetic audio data output from the audio synthesis unit 160 and video data stored in the second shared memory 145 to obtain audio/video synthesis data.

The information processing apparatus 100 may further include a video output unit 180 and an audio output unit 190. The video output unit 180 outputs video based on video data contained in audio/video synthesis data obtained by the audio synthesis unit 160. The video output unit 180 includes an apparatus capable of visually notifying the user of acquired information, for example, a CRT display apparatus, liquid crystal display apparatus, plasma display apparatus, EL display apparatus, or display apparatus such as a lamp.

The audio output unit 190 outputs synthetic audio based on synthetic audio data contained in audio/video synthesis data obtained by the audio synthesis unit 160. The audio output unit 190 includes an apparatus capable of aurally notifying the user of acquired information, for example, a speaker or headphone. An audio output apparatus converts an audio signal composed of reproduced audio data, acoustic data and the like into an analog signal and output it.

In the foregoing, the hardware configuration of the information processing apparatus 100 according to the first embodiment of the present invention has been described. Next, the function of the information processing apparatus 100 according to the first embodiment of the present invention will be described.

2. First Embodiment (Function of the Information Processing Apparatus)

Figure 2:
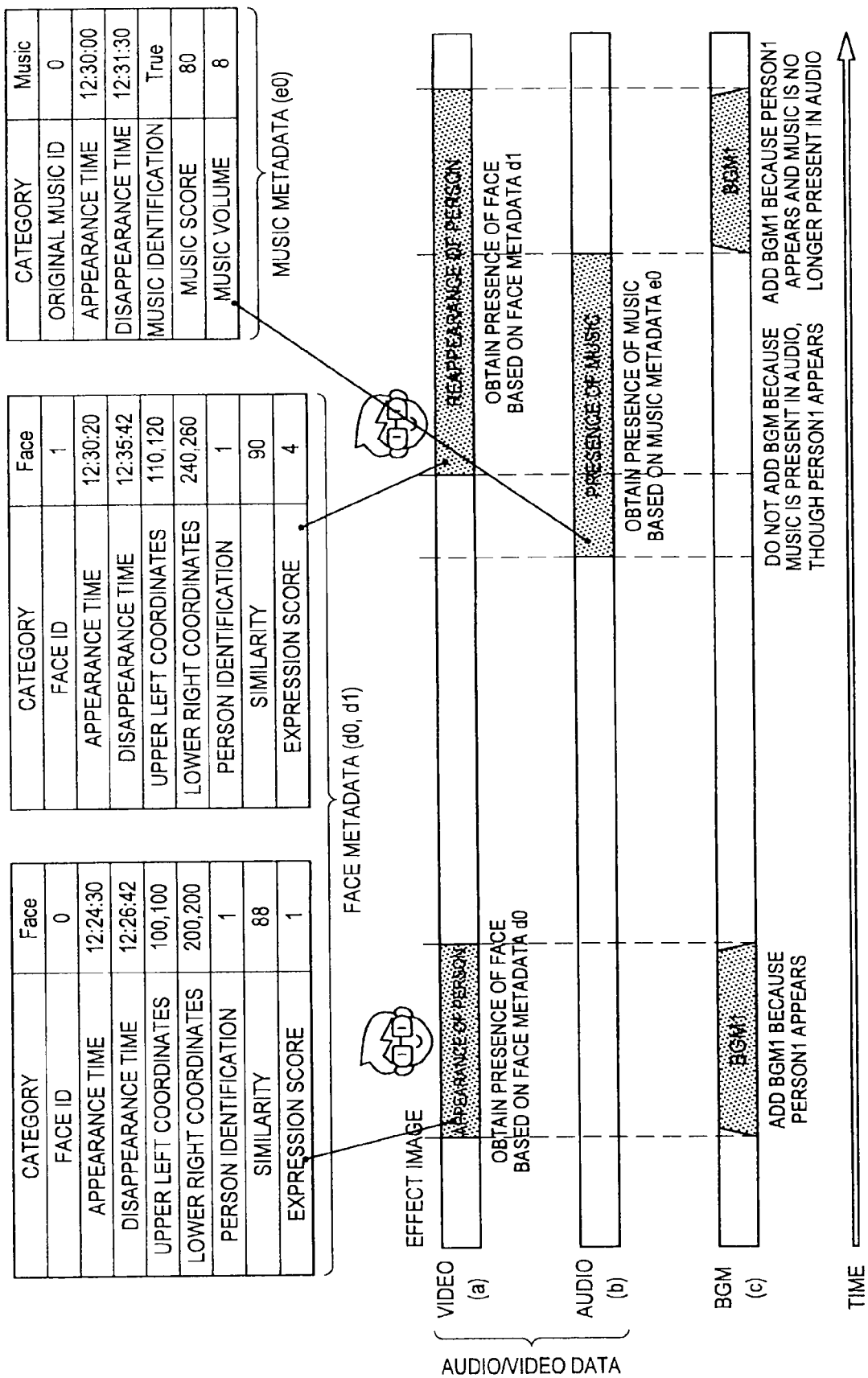
FIG. 2 is a fundamental diagram showing a concept of the first embodiment.

The function of an information processing apparatus according to the first embodiment of the present invention will be described. FIG. 2 is a diagram illustrating the function of an information processing apparatus according to the first embodiment of the present invention. The function of an information processing apparatus according to the first embodiment of the present invention will be described below with reference to FIG. 2 (FIG. 1 is referenced when appropriate).

As shown in FIG. 2, the audio/video data 112 (shooting record video stream of a reproduction source) is configured to include video data (video unit (a)) and audio data (audio unit (b)). In the example shown in FIG. 2, when the reproducing unit 120 starts reproduction of the audio/video data 112, a person whose face ID (face identification information) is "0" appears. The face ID is a serial number assigned in the order of face appearance and a different face ID is assigned even to the same person if the person disappears and then reappears. The appearance of the person whose face ID is "0" can be recognized by reading the face metadata 114 (d0) associated with shooting record video in advance.

In addition to the face ID, the face metadata 114 (d0) has the appearance time and disappearance time of the face, coordinates when the face appears, person identification showing a registered person number (however, number 0 is an unregistered person), similarity showing the likelihood of the identified person and expression score showing the degree of a smiling face of expression. By reading the appearance time and disappearance time of a face in the face metadata 114 (d0), the control unit 140 can know the appearance time and disappearance time of the person in the video. The above face present time is specified, for example, in the range after the appearance time of the face and before the disappearance time of the face.

In the example shown in FIG. 2, the control unit 140 determines that no music is originally present in the interval of the audio unit (b) corresponding to the video unit (a) in the range after the appearance time of the face shown by the face metadata 114 (d0) and before the disappearance time. Thus, the audio synthesis unit 160 superimposes BGM 1 corresponding to preregistered person identification "1" in an additional audio unit (BGM (c)) on the audio unit (b) and the audio output unit 190 outputs the superimposed audio. At this point, it is preferable to start the BGM 1 with a fade-in and end the BGM 1 with a fade-out to avoid surprising viewers by a sudden sound of BGM. Accordingly, an effect of sounding a theme tune of a specific person when the person appears is achieved.

Information when a person whose face ID is "1" appears as a second person can be recognized by the face metadata 114 (d1) being read by the control unit 140 in advance. However, since music sounds in the audio unit (b) when the person whose face ID is "1" appears in FIG. 2, the control unit 140 does not allow addition of BGM to the additional audio unit (c). That music is sounding in the audio unit (b) is shown in the music metadata 116 (e0).

The music metadata 116 (e0) includes an original music ID assigned in the order of appearance of the detected music and has the appearance time and disappearance time of the music, music identification (true if "True" and false if "False"), music score (score of music-likeness), and volume level as information. The above music present time is specified, for example, in the range after the appearance time of the music and before the disappearance time of the music.

An existing technique such as the twelve-tone analysis can be used for the music score and as a music detection method. In this case, by recording metadata only from the viewpoint of whether music is present, the amount of metadata recording can be reduced. By comparing the appearance time and disappearance time of the face metadata 114 and those of the music metadata 116, the interval in which only a face is present, the interval in which only music is present, the interval in which a face and music are present, and the interval in which nothing is detected can be distinguished. In the example shown in FIG. 2, music disappears during the appearance of the person whose face ID is "1" and thus, the BGM 1 corresponding to the person identification "1" whose face ID is "1" is added to the additional audio unit (c) in the interval in which only the face of the person whose face ID is "1" is present after disappearance of the music.

In the example shown in FIG. 2, a case in which only a person appears is described for convenience, but similar processing can be performed when a plurality of persons appears. When a plurality of faces appears, separate BGM can be sounded for each person, but a case in which a plurality of registered persons is present in the same interval can also be assumed. In such a case, BGM of which person to add to the additional audio unit (c) can be decided by the size of face, prioritization based on the person identification number, expression score or the like. BGM of a person with a large face may be prioritized or BGM corresponding to a person prioritized in advance may be sounded by priority.

In the foregoing, the function of the information processing apparatus 100 according to the first embodiment of the present invention has been described. Next, the operation of the information processing apparatus 100 according to the first embodiment of the present invention will be described.

3. First Embodiment (Operation of the Information Processing Apparatus)

Figure 3:
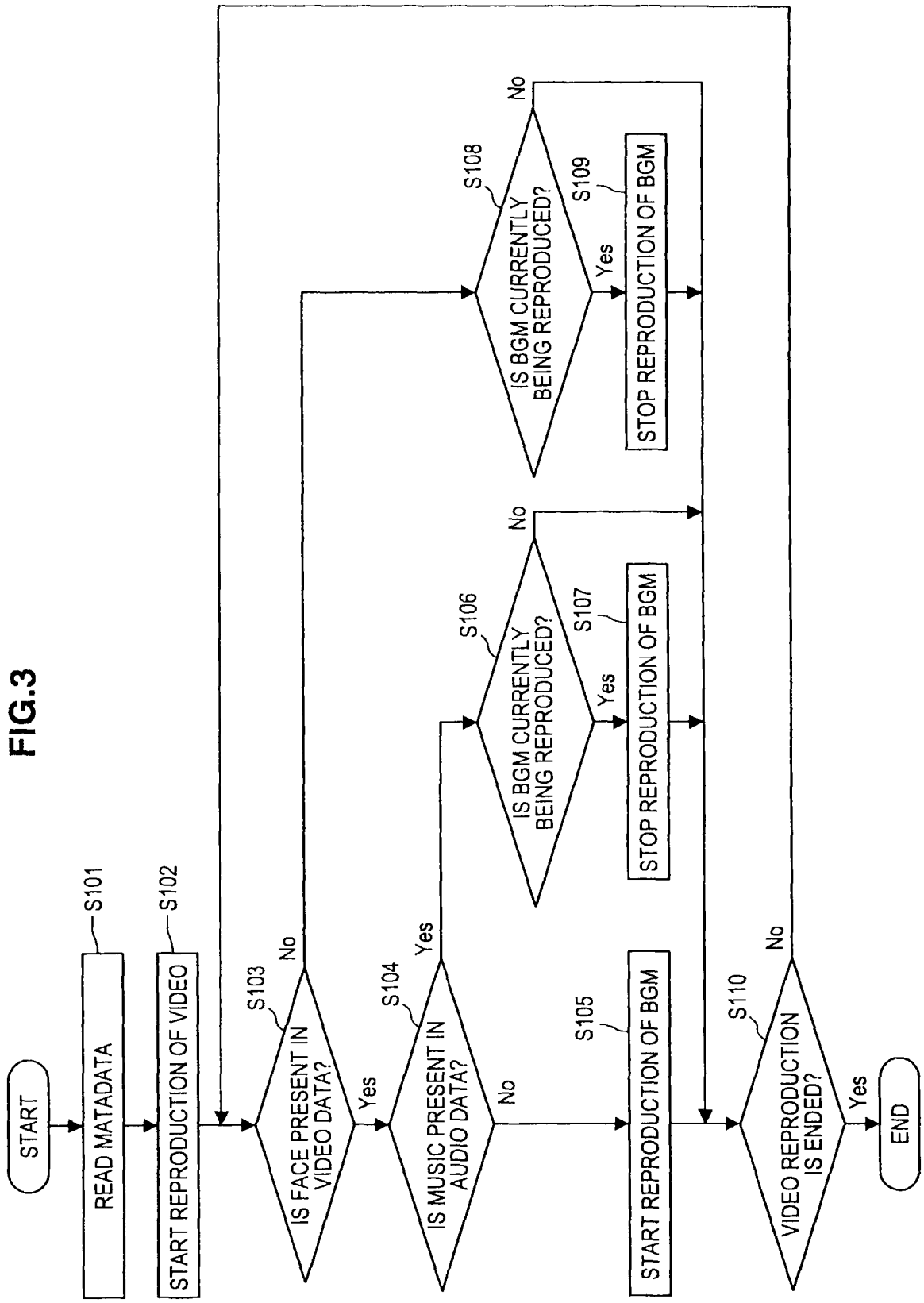
FIG. 3 is a flow chart of control when the information processing apparatus according to the first embodiment reproduces video with BGM.

The operation of an information processing apparatus according to the first embodiment of the present invention will be described. FIG. 3 is a flow chart showing the operation of an information processing apparatus according to the first embodiment of the present invention. The operation of an information processing apparatus according to the first embodiment of the present invention will be described below with reference to FIG. 3 (FIG. 1 or FIG. 2 is referenced when appropriate).

First, at step S101, the control unit 140 reads and analyzes all metadata. Then, at step S102, the reproducing unit 120 starts reproduction of video (the audio/video data 112). Next, at step S103, the control unit 140 determines whether there is any face at the current reproduction position in the video (a). If a face is present ("Yes" at step S103), the control unit 140 moves to step S104 and if no face is present ("No" at step S103), the control unit 140 moves to step S108.

At step S104, the control unit 140 determines whether there is music at the current reproduction position in the audio (b). If no music is present ("No" at step S104), the control unit 140 moves to step S105 and if music is present ("Yes" at step S104), the control unit 140 moves to step S106.

If the control unit 140 moves to step S105, this means that a face is present at the current reproduction position in the video (a) and no music is present in the audio (b). Thus, the reproducing unit 120 starts reproduction of BGM to allow addition of BGM. At this point, it is preferable to start reproduction with a fade-in. If the control unit 140 moves to step S106, this means that a face is present at the current reproduction position in the video (a) and music is present in the audio (b) and thus, it is necessary not to allow addition of BGM. Therefore, at step S106, the control unit 140 determines whether currently being reproduced with added BGM. If currently being reproduced with added BGM ("Yes" at step S106), the control unit 140 moves to step S107 and the reproducing unit 120 stops reproduction of BGM. At this point, it is preferable to stop reproduction with a fade-out. If currently not being reproduced with added BGM ("No" at step S106), the control unit 140 moves to step S110.

If the control unit 140 moves to step S108, no face is present at the current reproduction position in the video (a) and it is necessary not to allow addition of BGM. Therefore, at step S108, the control unit 140 determines whether currently being reproduced with added BGM. If currently being reproduced with added BGM ("Yes" at step S108), the control unit 140 moves to step S109 and the reproducing unit 120 stops reproduction of BGM. At this point, it is preferable to stop reproduction with a fade-out. If currently not being reproduced with added BGM ("No" at step S108), the control unit 140 moves to step S110.

At step S110, the control unit 140 determines whether to end reproduction of the video (the audio/video data 112). When reproduction of the video should end is, for example, when the reproducing unit 120 has reproduced the audio/video data 112 to the end or when a reproduction end instruction is input by the user from an input unit (not shown). When reproduction of the video should end ("Yes" at step S110), BGM added reproduction ends directly. When reproduction of the video should not end ("No" at step S110), the control unit 140 returns to step S103 to repeat BGM added reproduction or stop processing while reproducing video.

With the above processing, BGM added reproduction can most easily be performed only in an interval in which a face is present in video and no music is present in audio.

In the foregoing, the operation of the information processing apparatus 100 according to the first embodiment of the present invention has been described. Next, the second embodiment of the present invention will be described. In the first embodiment, basic BGM added reproduction processing can be performed. The second embodiment described below can support cases when BGM is registered for each person (face), whether to add BGM should be confirmed for each scene, or BGM addition due to erroneous detection or the like should be avoided.

4. Second Embodiment (Hardware Configuration of the Information Processing Apparatus)

Figure 4:
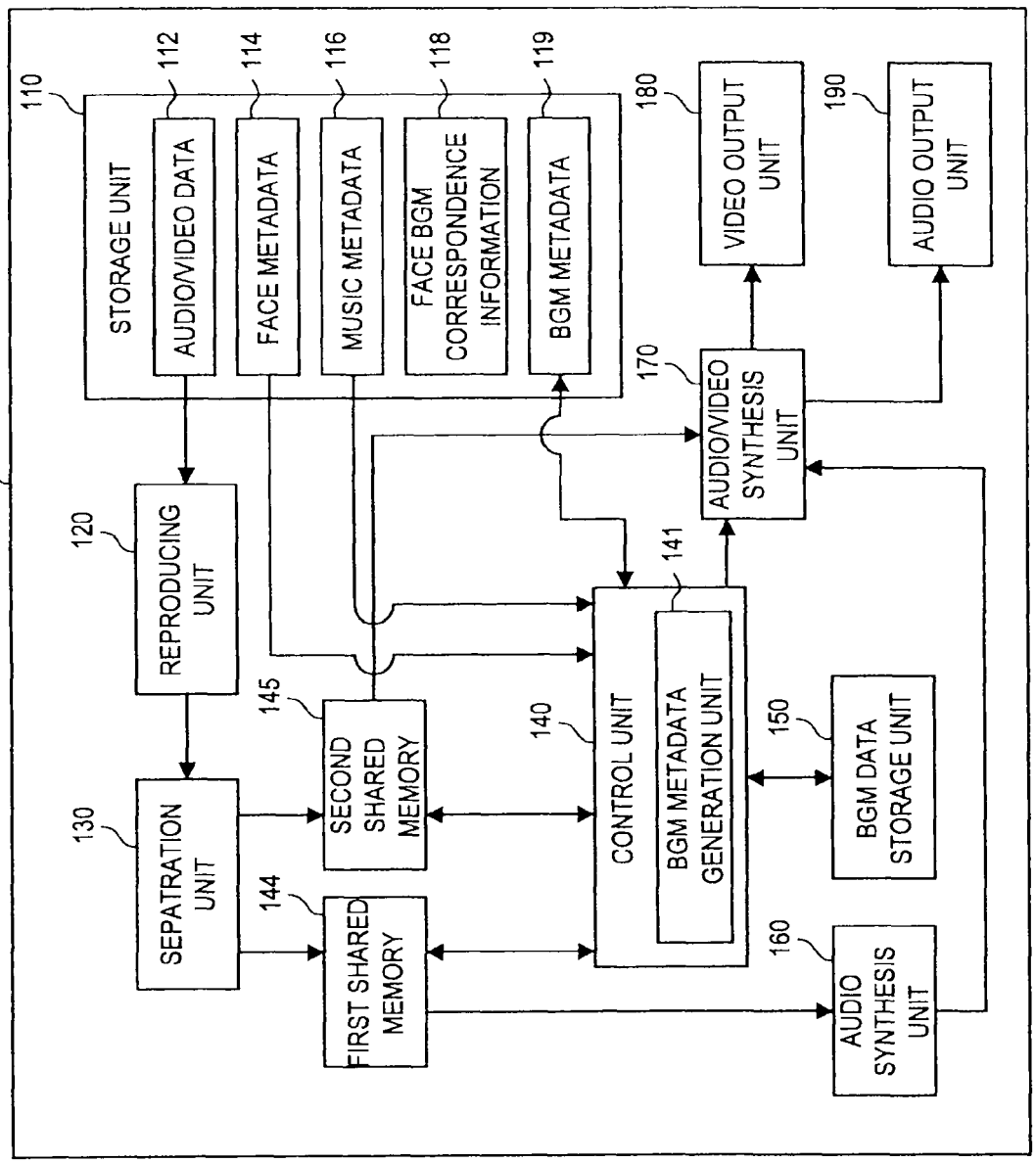
FIG. 4 is a block diagram showing the configuration of an information processing apparatus according to a second embodiment.

First, the hardware configuration of an information processing apparatus according to the second embodiment of the present invention will be described. FIG. 4 is a diagram showing the hardware configuration of an information processing apparatus according to the second embodiment. The hardware configuration of an information processing apparatus according to the second embodiment will be described below with reference to FIG. 4.

The information processing apparatus 100 according to the second embodiment is different from the information processing apparatus 100 according to the first embodiment in that the control unit 140 includes a BGM metadata generation unit 141. The hardware configuration of the information processing apparatus 100 according to the second embodiment will be described below.

The BGM metadata generation unit 141 has a function to generate BGM metadata 119 by associating BGM present time information indicating the time decided by the control unit 140 to output BGM with BGM identification information and to cause the storage unit 110 to store the BGM metadata 119.

Moreover, the storage unit 110 may further store the audio/video data 112 and the information processing apparatus 100 may further include the BGM data storage unit 150, the reproducing unit 120, the separation unit 130, the audio synthesis unit 160, and the audio/video synthesis unit 170. The BGM data storage unit 150, the reproducing unit 120, and the separation unit 130 have the similar functions as those in the first embodiment and thus, a detailed description thereof is omitted.

When reproduction advances to the time indicated by BGM present time information of the BGM metadata 119 stored in the storage unit 110, the audio synthesis unit 160 obtains synthetic audio data by synthesizing BGM data identified by BGM identification information and audio data obtained by the separation unit 130.

In the foregoing, the hardware configuration of the information processing apparatus 100 according to the second embodiment of the present invention has been described. Next, the function of the information processing apparatus 100 according to the second embodiment of the present invention will be described.

5. Second Embodiment (Function of the Information Processing Apparatus)

Figure 5:
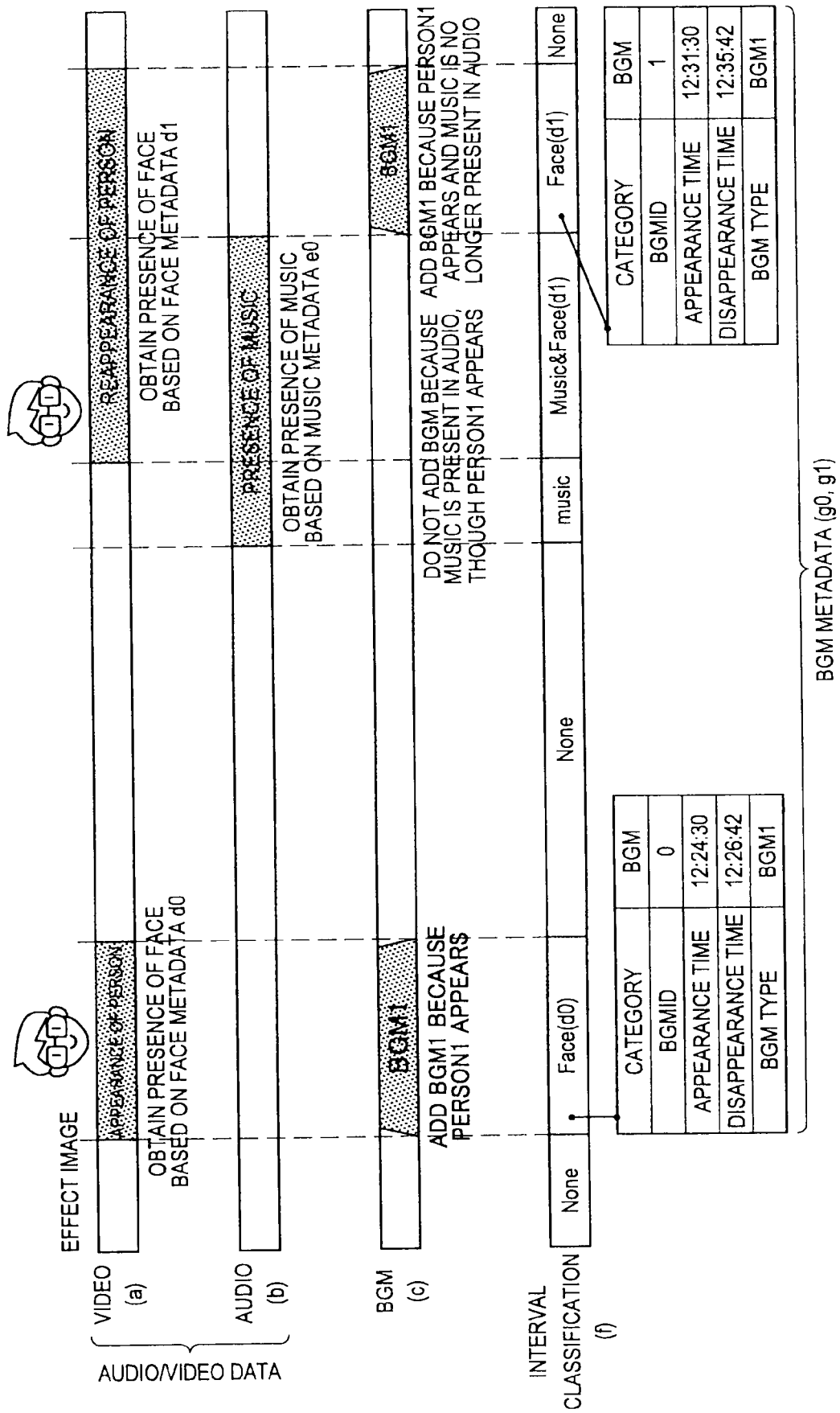
FIG. 5 is a fundamental diagram showing a concept of the second embodiment.

The function of an information processing apparatus according to the second embodiment of the present invention will be described. FIG. 5 is a diagram illustrating the function of an information processing apparatus according to the second embodiment of the present invention. The function of an information processing apparatus according to the second embodiment of the present invention will be described below with reference to FIG. 5 (FIG. 4 is referenced when appropriate).

The second embodiment is different from the first embodiment in that each interval (f) of the audio/video data 112 is classified based on associations with the face metadata 114 and the music metadata 116. As a classification method, for example, classification of four types of neither face nor music is present (None), only a face is present (Face), only music is present (Music), and music and a face overlap (Music&Face) can be considered. Since BGM is added to only the (Face) interval in which only a face is present, there is no need to make a classification of the above four types if the (Face) interval in which only a face is present can be detected.

Each (Face) interval in which only a face is present is linked to the corresponding face metadata 114 (d0, d1, ... ) and the BGM metadata generation unit 141 adds BGM metadata (g0, g1, ... ) to further add BGM. Each piece of BGM metadata (g0, g1, ... ) includes the BGMID, appearance time and disappearance time of BGM, and a type of BGM. If reproduction with added BGM should be performed, the information processing apparatus 100 classifies intervals based on associations with the face metadata 114 and the music metadata 116 and creates BGM metadata (g0, g1, ... ) by the BGM metadata generation unit 141, which is stored in the storage unit 110. Then, when reproduction with added BGM is actually performed, BGM added reproduction and stop processing are performed by referencing only BGM metadata (metadata whose category is BGM).

6. Second Embodiment (Addition Processing of BGM Metadata)

Figure 6:
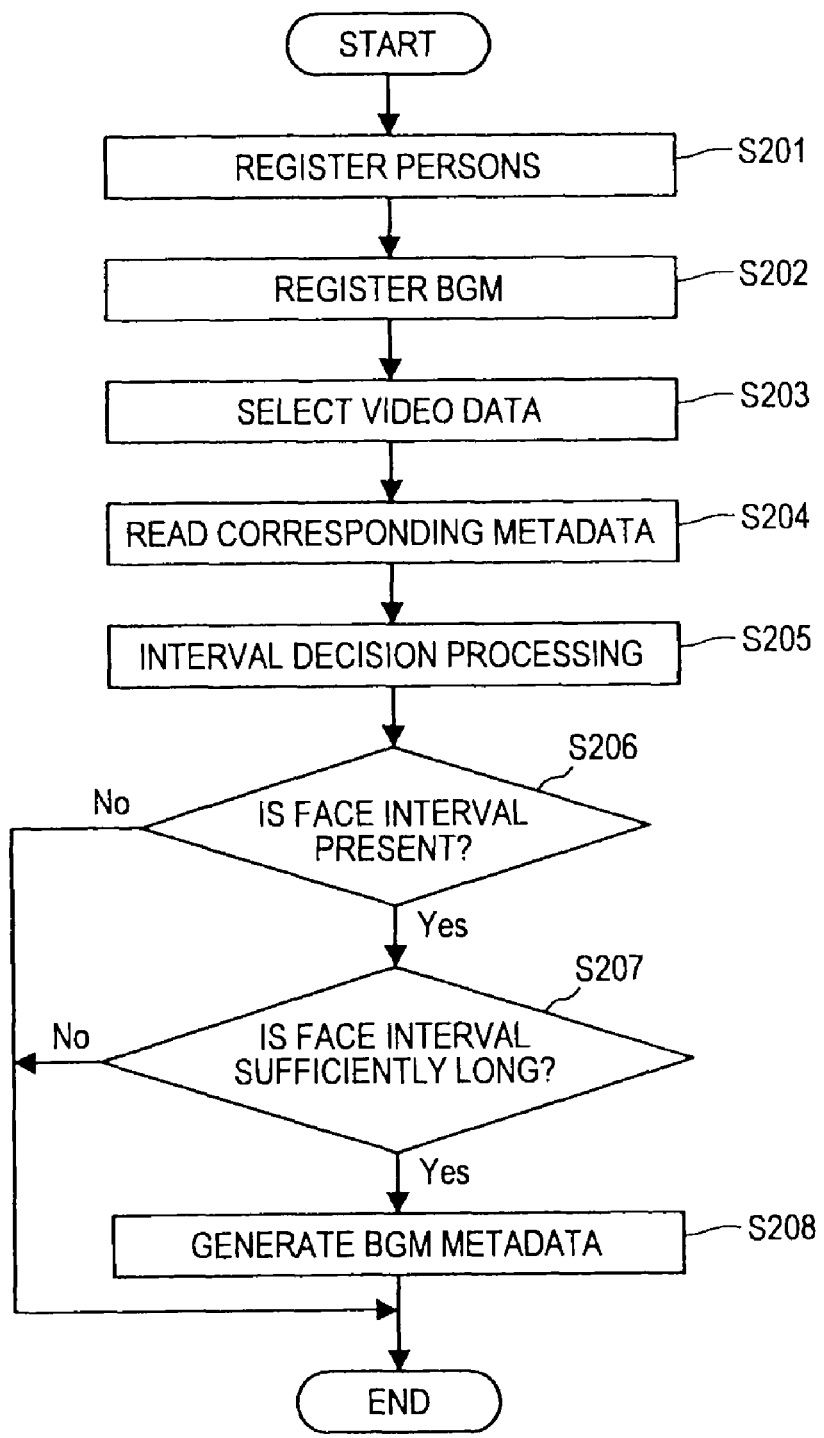
FIG. 6 is a flow chart of control of preprocessing to add BGM metadata in the information processing apparatus according to the second embodiment.

The operation (BGM metadata addition processing) of an information processing apparatus according to the second embodiment of the present invention will be described. FIG. 6 is a flow chart showing the operation (BGM metadata addition processing) of an information processing apparatus according to the second embodiment of the present invention. The operation (BGM metadata addition processing) of an information processing apparatus according to the second embodiment of the present invention will be described below with reference to FIG. 6 (FIG. 4 or FIG. 5 is referenced when appropriate).

Figure 7A:
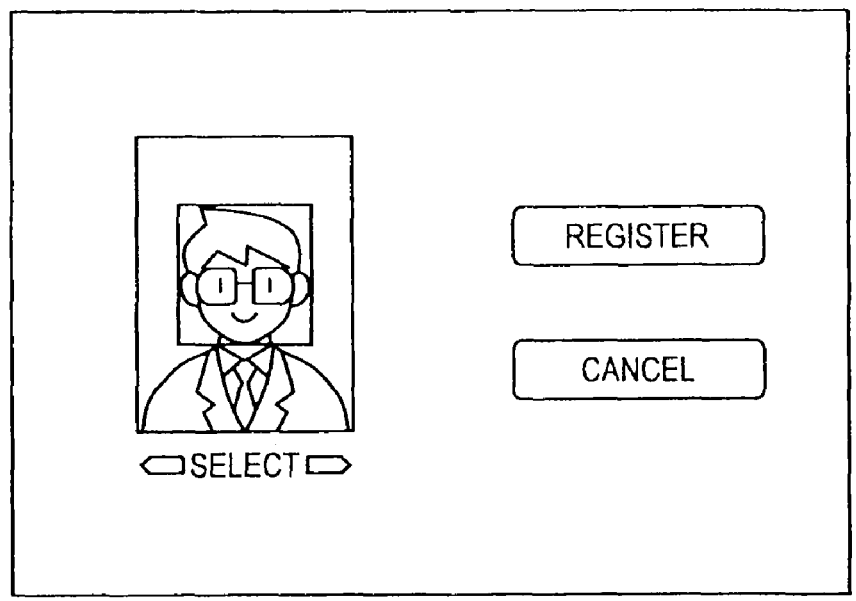
FIG. 7 is a diagram showing a concrete example of GUIs according to the second embodiment.

First, at step S201, registration work of a person to which BGM should be added is done. Here, GUIs as shown in FIG. 7(a) may be provided so that a person to be registered is selected to register the person (face) by pressing a registration button. A plurality of persons may also be registered.

Figure 7B:
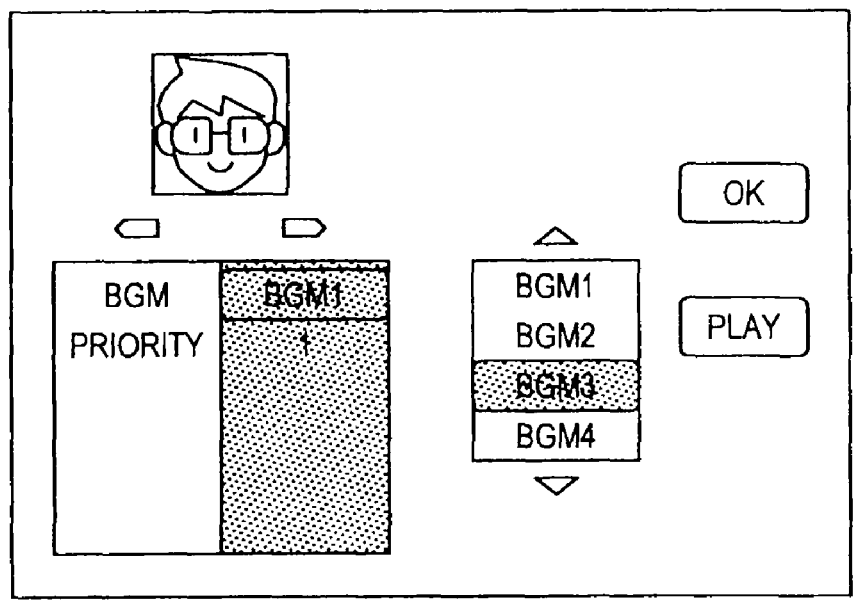

At step S202, the control unit 140 selects and registers (links) BGM to be added to the registered person. The control unit 140 causes the storage unit 110 to store the registered person and BGM to be added as the face BGM correspondence information 118. Here, GUIs as shown in FIG. 7(b) may be provided to allow confirmation of the registered person, selection of BGM to be added to the person, and settings of priority when a plurality of faces is detected. In this case, moreover, selection may be made easier by actually reproducing BGM for confirmation.

Next, at step S203, video data (chapter or file, play list) to which BGM should be added is selected. For example, video may be selected by arranging thumbnail image listings of video data. A plurality of files is made selectable.

Next, at step S204, the control unit 140 reads all of the face metadata 114 and the music metadata 116 corresponding to the video data selected at step S203.

Next, at step S205, the BGM metadata generation unit 141 chronologically arranges the face metadata 114 and the music metadata 116 that have been read to decide the interval classification (f). Here, for example, the BGM metadata generation unit 141 determines that an interval in which neither face nor music is present as (None), an interval in which only a face is present as (Face), an interval in which only music is present as (Music), and an interval in which both music and a face are present as (Music&Face). As a determination method, the interval classification can be decided by comparing date/time information (year/month/day/hour/minute/second) recorded in an additional information pack (not shown) of each piece of the audio/video data 112 and the appearance time and disappearance time contained in each piece of metadata.

If the interval (Face) in which only a face is present is detected, the BGM metadata generation unit 141 sets a link of the corresponding face data. If a plurality of registered persons is present in the same interval, a link of which face to set will have to be decided by the size of face, prioritization by the person identification number, expression score or the like. Normally, a link of the face of a large size is set as the main object.

Then, at step S206, the BGM metadata generation unit 141 determines whether any (Face) interval in which only a face is present is present in the determined interval (f). If the (Face) interval is present ("Yes" at step S206), the BGM metadata generation unit 141 determines at step S207 whether the (Face) interval is sufficiently long. While the determination time may be made to be selected from values such as 5 sec, 10 sec, 20 sec and the like, it is preferable to set 10 sec as the determination time. If the (Face) interval is sufficiently long ("Yes" at step S207), the BGM metadata generation unit 141 moves to step S208. At step S208, the BGM metadata generation unit 141 determines the face from the link of face data corresponding to the (Face) interval in which only the detected face is present and selects BGM associated with the face at step S202. The BGM metadata generation unit 141 creates BGM metadata and adds the BGM metadata to a metadata area of a system index file (described later) before completing processing.

If no (Face) interval in which only a face is present is present at step S206 ("No" at step S206) or the (Face) interval in which only a face is present is determined not to be sufficiently long at step S207 ("No" at step S207), processing terminates directly.

When BGM metadata is added at step S208, the user may be caused to confirm whether to decide addition of BGM by displaying the applicable BGM addition screen for reproduction. At this point, if different BGM is made selectable when BGM to be added appears to be different an image of the user, a sense of usage can be improved.

In the foregoing, the operation (BGM metadata addition processing) of the information processing apparatus 100 according to the second embodiment of the present invention has been described. Next, the operation (BGM added reproduction) of the information processing apparatus 100 according to the second embodiment of the present invention will be described.

7. Second Embodiment (BGM Added Reproduction)

Figure 8:
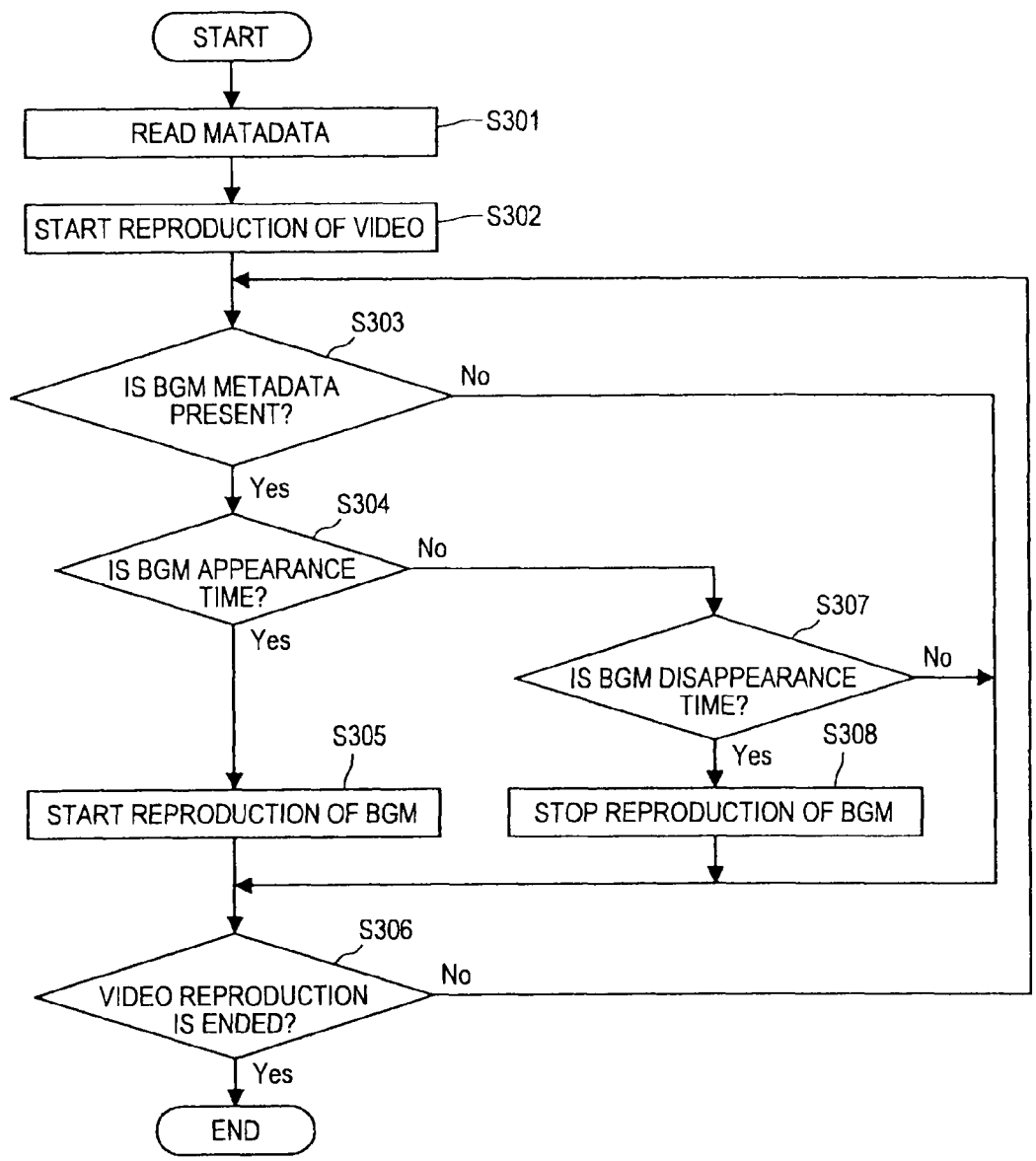
FIG. 8 is a flow chart of control when the information processing apparatus according to the second embodiment is reproduced with BGM.

The operation (BGM added reproduction) of the information processing apparatus 100 according to the second embodiment of the present invention will be described. FIG. 8 is a flow chart showing the operation (BGM added reproduction) of an information processing apparatus according to the second embodiment of the present invention. The operation (BGM added reproduction) of an information processing apparatus according to the second embodiment of the present invention will be described below with reference to FIG. 8 (FIG. 4 or FIG. 5 is referenced when appropriate).

First, at step S301, the control unit 140 reads BGM metadata corresponding to the audio/video data 112 to be reproduced. Next, at step S302, the reproducing unit 120 starts reproduction of the video (the audio/video data 112) to be reproduced. At step S303, the control unit 140 determines whether BGM metadata (BGM metadata whose category is "BGM") is present. If BGM metadata is present ("Yes" at step S303), the control unit 140 moves to step S304 and if BGM metadata is not present ("No" at step S303), the control unit 140 moves to step S306.

At step S304, the control unit 140 determines whether time information of the video currently being reproduced matches the BGM appearance time of the BGM metadata. If matched ("Yes" at step S304), the control unit 140 moves to step S305 and if not matched ("No" at step S304), the control unit 140 moves to step S307.

If the control unit 140 moves to step S305, this means that the reproduction time of the video matches the BGM appearance time. Thus, the reproducing unit 120 starts reproduction of BGM and moves to step S306. At this point, it is preferable to start reproduction with a fade-in. The control unit 140 moves to step S307 when BGM does not sound or is already sounding. Thus, at step S307, the control unit 140 determines whether time information of the video currently being reproduced is the BGM disappearance time of the BGM metadata. If the determination result at step S306 is "Yes", the control unit 140 moves to step S308 and if the determination result is "No", the control unit 140 moves to step S306. If the control unit 140 moves to step S308, it is necessary to stop BGM currently sounding and thus, the reproducing unit 120 stops reproduction of BGM before moving to step S306. At this point, it is preferable to stop reproduction with a fade-out.

At step S306, whether to end video reproduction is determined and if video reproduction should end ("Yes" at step S306), the control unit 140 terminates video reproduction. If video reproduction should not end ("No" at step S306), the control unit 140 returns to step S303 to repeat processing to determine whether to start or stop reproduction of BGM based on BGM metadata.

With the above processing, editing with BGM and reproduction results can easily be obtained in a short time. Moreover, there is an advantage that video in the original state can easily be reproduced because, instead of directly editing original video data, BGM metadata is only added and whether to add BGM is determined during reproduction.

In the foregoing, the operation of the information processing apparatus 100 according to the second embodiment of the present invention has been described. Next, a third embodiment of the present invention will be described. In the information processing apparatus 100 described in the first and the second embodiments, incorporation of functions thereof into an imaging apparatus such as a video camcorder that records audio/video data particularly in a recording apparatus such as a hard disk is considered to be appropriate. The third embodiment described below concerns an imaging apparatus having the functions of the information processing apparatus described above.

8. Third Embodiment (Hardware Configuration of the Imaging Apparatus)

Figure 9:
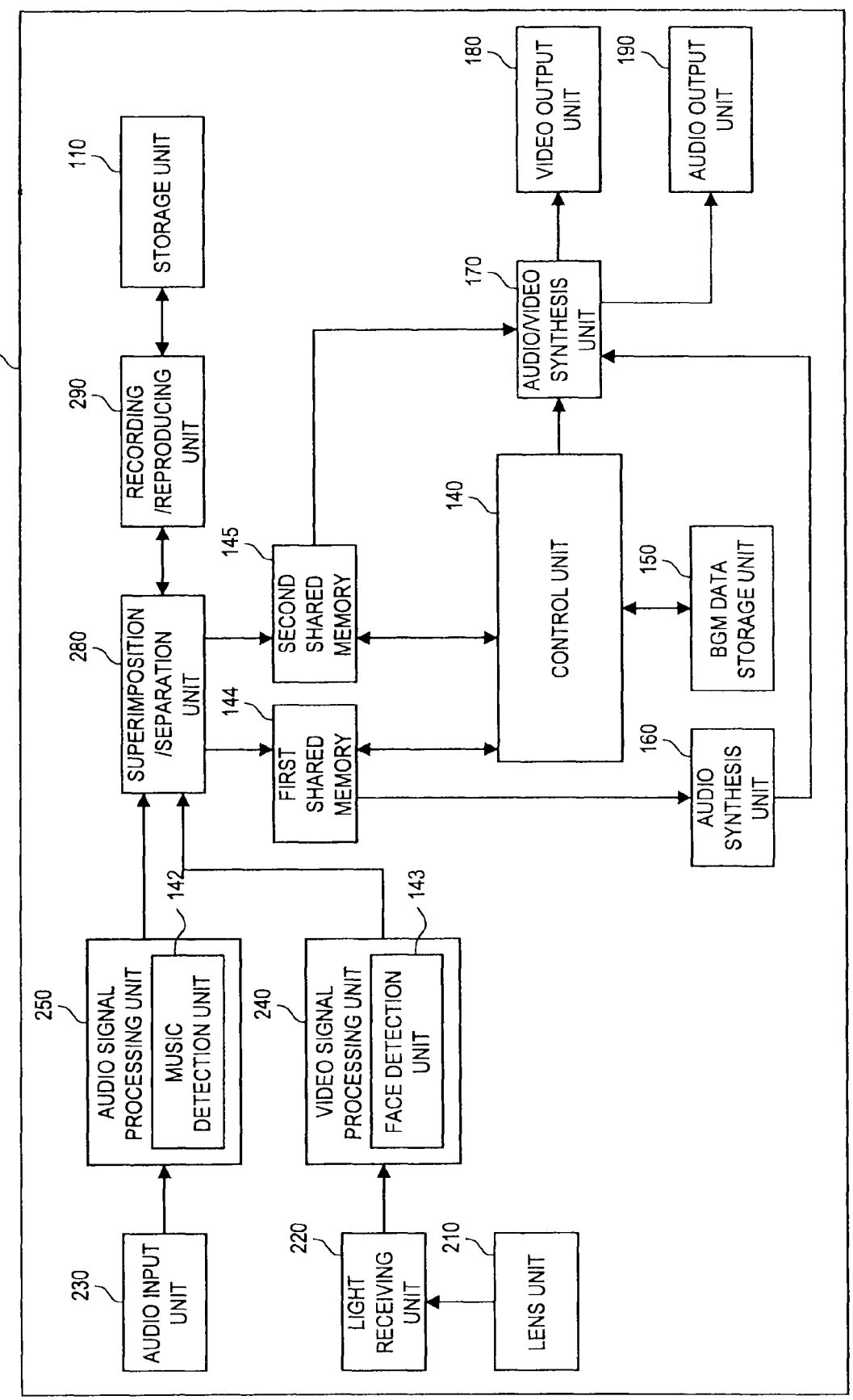
FIG. 9 is a block diagram showing the configuration of an information processing apparatus according to a third embodiment.

The hardware configuration of an imaging apparatus according to the third embodiment of the present invention will be described. FIG. 9 is a diagram showing the hardware configuration of an imaging apparatus according to the third embodiment. The hardware configuration of an imaging apparatus according to the third embodiment will be described below with reference to FIG. 9.

Video received by a light receiving unit 220 through a lens unit 210 is converted into a video signal by a video signal processing unit 240. At the same time, audio received by an audio input unit 230 is converted into an audio signal by an audio signal processing unit 250. A superimposition/separation unit 280 superimposes the above audio signal on the above video signal and performs a format conversion through a recording/reproducing unit 290 and stores the superimposed signal in the storage unit 110 as a file. The audio signal processing unit 250 contains a music detection unit 142, which analyzes input audio to see whether music is contained in the input audio and makes a notification to the control unit 140. The video signal processing unit 240 contains a face detection unit 143, which, when a face is detected in video, detects temporal and spatial position information of the detected face in the video and makes a notification to the control unit 140.

The control unit 140 controls the above processing and records music present information detected by the music detection unit 142 in the storage unit 110 through the recording/reproducing unit 290 as attendant information (metadata) of audio/video data. The control unit 140 also records face information detected by the face detection unit 143 in the storage unit 110 through the recording/reproducing unit 290 as attendant information (metadata) of audio/video data. Further, the control unit 140 receives electric signal input from a key input circuit (not shown) or GUI input from a video output unit 180 (LCD panel with a mounted touch panel) to switch the recording/reproduction mode of a video signal.

An imaging apparatus 200 fetches a video signal from a file recorded in the storage unit 110 during reproduction to decode the video signal through the recording/reproducing unit 290. Then, the imaging apparatus 200 generates onscreen display image information such as GUIs and various kinds of information through an onscreen display circuit (not shown) and displays onscreen display images in the video output unit 180 (LCD panel with a mounted touch panel) after superimposition of onscreen display images by the superimposition/separation unit 280. Also, an audio signal is similarly decoded by the recording/reproducing unit 290 and outputs from the audio output unit 190.

When video/audio data is reproduced, the control unit 140 determines whether to add BGM to the video/audio data based on face present information and music present information using attendant information (metadata) of the video/audio data. If BGM should be added, the control unit 140 reads a BGM file stored in the storage unit 110 or the BGM data storage unit 150 to allow addition and reproduction of BGM by the recording/reproducing unit 290 and the superimposition/separation unit 280.

The control unit 140 of the imaging apparatus 200 described above receives power supply from an external power supply AC or batteries via a power circuit and sends a control signal to control power ON/OFF to other circuits. As the recording method of video signal, the high definition (HD) recording using the AVCHD (trademark) standard using the MPEG-4 AVC/H.264 compression or standard definition (SD) recording using the MPEG-2 compression is supported.

In the foregoing, the hardware configuration of the imaging apparatus 200 according to the third embodiment has been described. Next, the fourth embodiment of the present invention will be described. The fourth embodiment is different from the third embodiment in that the control unit 140 is provided with the music detection unit 142 and the face detection unit 143.

9. Fourth Embodiment (Hardware Configuration of the Imaging Apparatus)

Figure 10:
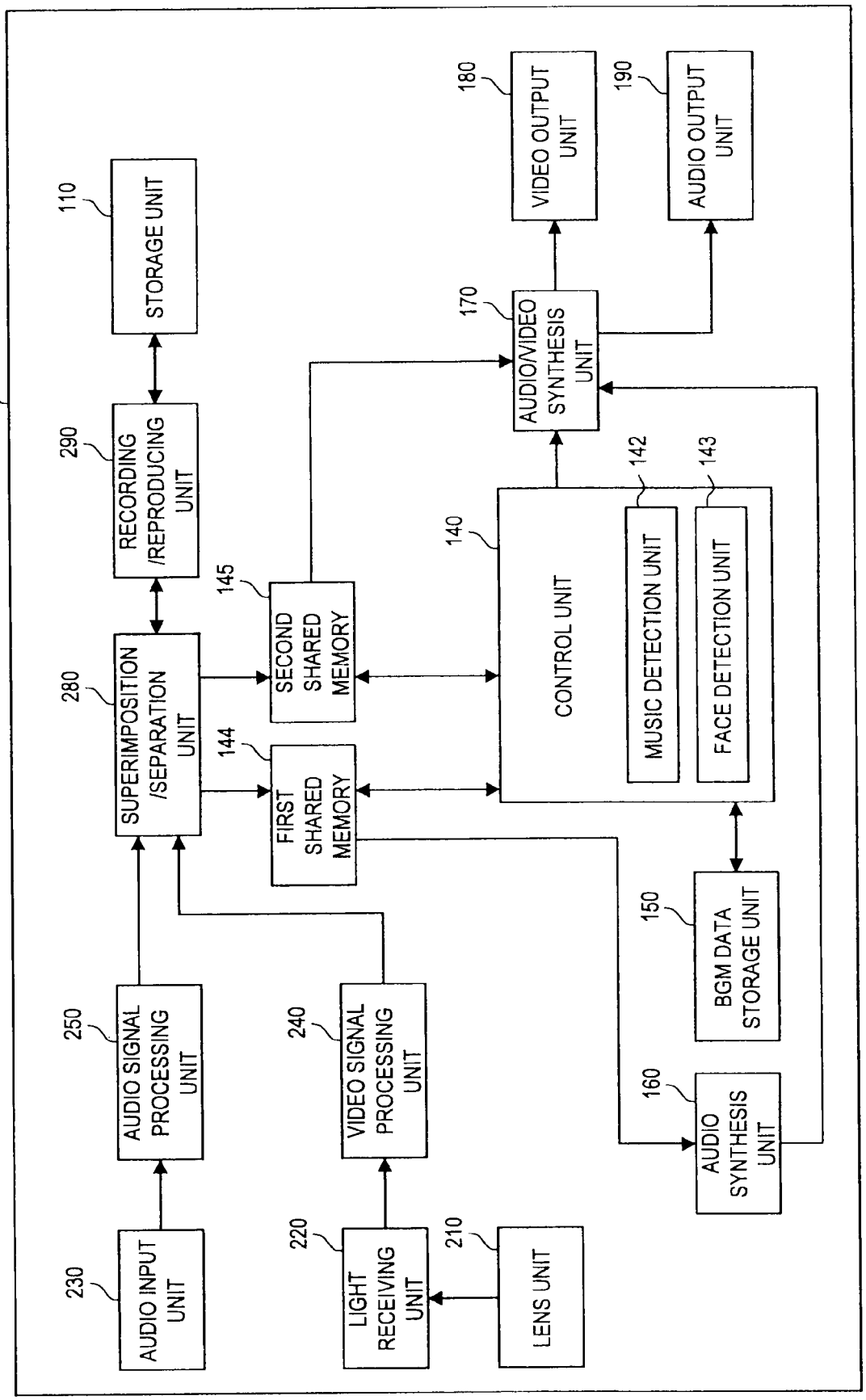
FIG. 10 is a block diagram showing the configuration of an information processing apparatus according to a fourth embodiment.

The hardware configuration of an imaging apparatus according to a fourth embodiment of the present invention will be described. FIG. 10 is a diagram showing the hardware configuration of an imaging apparatus according to the fourth embodiment. The hardware configuration of an imaging apparatus according to the fourth embodiment will be described below with reference to FIG. 10.

The video signal processing unit 240 and the audio signal processing unit 250 are provided with the face detection unit 143 and the music detection unit 142 respectively in the third embodiment, but, as shown in FIG. 10, the control unit 140 may be provided with the face detection unit 143 and the music detection unit 142. In this case, detection of a face or that of music in audio/video data can be performed after causing the storage unit 110 to store the audio/video data so that more complex editing functions becomes implementable together with other editing functions.

In the foregoing, the hardware configuration of the imaging apparatus 200 according to the fourth embodiment has been described. Next, a recording technique of audio/video data will be described.

10. Recording Technique of Video Data

FIG. 11 is a diagram illustrating a recording technique of audio/video data according to the present embodiment of the present invention. A recording technique of audio/video data according to an embodiment of the present invention will be described below with reference to FIG. 11 (other figures are referenced when appropriate).

Figure 11A:
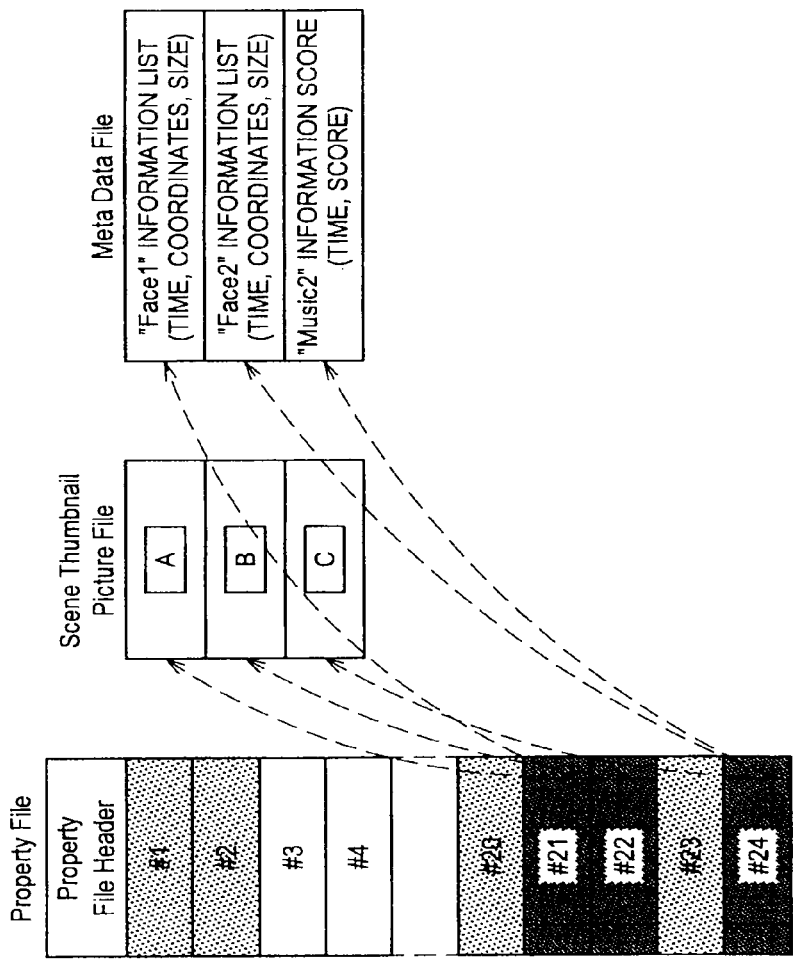
FIG. 11 is a diagram exemplifying a folder structure image of an image information management file and a real file configuration.
Figure 11B:
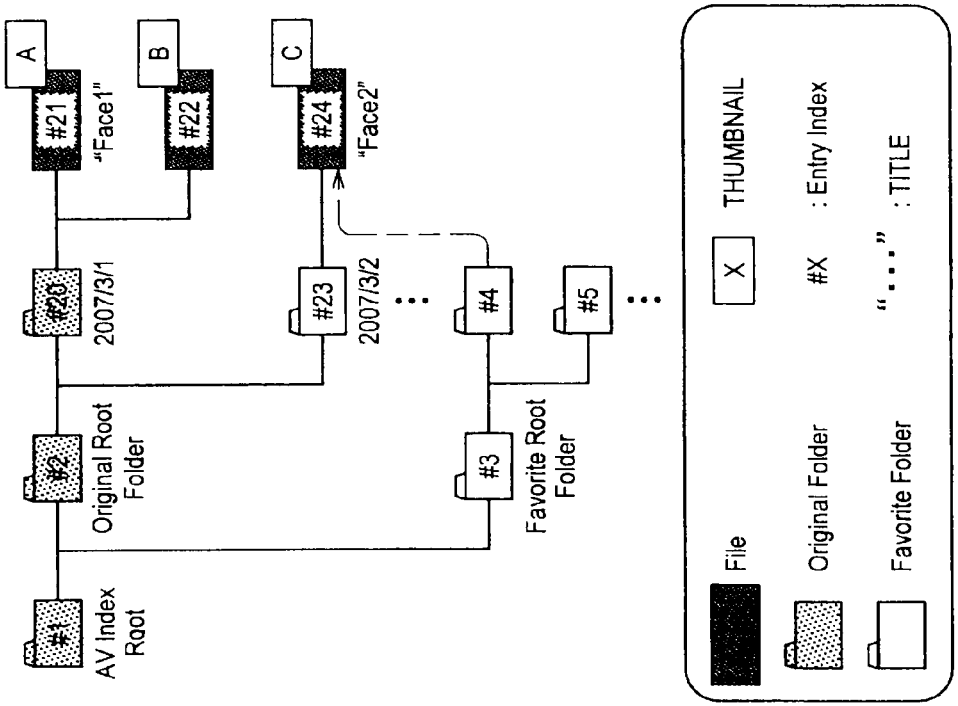

A technique to record audio/video data in the storage unit 110 will be proposed. As shown in FIG. 11(a), the imaging apparatus 200 creates a virtual folder in units of shooting dates to store shot dynamic image files (video data file) in order of shooting. It is assumed that, as shown in FIG. 11(b), dynamic image information (video data) is registered (this is called an entry) in a management file (also called a system index file). Dynamic image recording information includes file attributes, thumbnail index images, dynamic image attendant information (metadata) and the like (see also Japanese Patent Application Laid-Open No. 2007-181150).

It is assumed that the imaging apparatus 200 described above uses the face detection unit 143 to record the number of faces, sizes, positions, attributes and the like contained in a shooting target as metadata of a kind of dynamic image attendant information linked to a shot dynamic image in a dynamic image information management file during shooting (see also Japanese Patent Application Laid-Open Nos. 2008-17041 and 2008-228135). Also, the music detection unit 142 is used to determine whether music is formed by dividing an audio part of shot video into intervals of a predetermined length and using existing audio recognition technology, for example, the twelve-tone analysis that analyzes a characteristic data distribution of twelve-tone equal temperament. The resultant music presence position and determination score are recorded as metadata of a kind of dynamic image attendant information linked to a shot dynamic image. Regarding detection of music and conversation by twelve-tone analysis, Japanese Patent Application Laid-Open No. 2008-122426 can be referenced. While determination results are smoothed by taking a moving average of predetermined intervals of audio determination for error filtering in Japanese Patent Application Laid-Open No. 2008-122426, a moving average of music determination score is not taken here in consideration of real-time processability rather than an incorrect determination. Here, only information in which music sounds is left as metadata.

The imaging apparatus 200 reads BGM data stored in the storage unit 110 or the BGM data storage unit 150, decodes the BGM data by the recording/reproducing unit 290, superimposes the BGM data on audio of shot dynamic images, and outputs the audio from the audio output unit 190.

In the foregoing, the recording technique of audio/video data according to the present embodiment of the present invention has been described. Next, effects by the embodiments will be described.

11. Effects According to the Embodiments

According to the embodiments (the first to fourth embodiments), an interesting video effect of the same music being typically played in an appearance scene of a registered person can be obtained. Moreover, BGM can semi-automatically be added so that the user is not caused to feel annoying by BGM to be added being overlapped with music contained in the audio part of original images.

According to the second embodiment, BGM metadata can be added. Accordingly, similar BGM added reproduction results can be obtained between apparatuses supporting BGM metadata.

12. Modifications of the Embodiments

It should be understood by those skilled in the art that various modifications, combinations, sub-combinations and alterations may occur depending on design requirements and other factors insofar as they are within the scope of the appended claims or the equivalents thereof.

In the first to fourth embodiments, the information processing apparatus 100 may further include an input unit (not shown) capable of accepting instruction information indicating not to synthesize BGM data and audio data from the user. In this case, if the input unit (not shown) accepts input of instruction information from the user, the control unit 140 can cause the audio synthesis unit 160 not to synthesize BGM data and audio data. Accordingly, if BGM data is added to a scene in which a BGM effect setting is not desirable, the setting can be canceled.

In the first to fourth embodiments, if BGM is added immediately after an interval in which music of the original audio is present, a rapid change in volume can be avoided by adjusting the BGM volume to a value almost matching the audio level of music of the original audio. In this case, it is necessary to add the value of volume level to the BGM metadata to change the BGM volume according to the value.

In the second embodiment, BGM metadata and BGM data may be copied to a recording medium such as a memory card and optical disk together with audio/video data so that an apparatus supporting other BGM metadata is caused to use BGM metadata and BGM data copied to the recording medium. Accordingly, reproduction similar to that by the information processing apparatus 100 can be performed.

Figure 12:
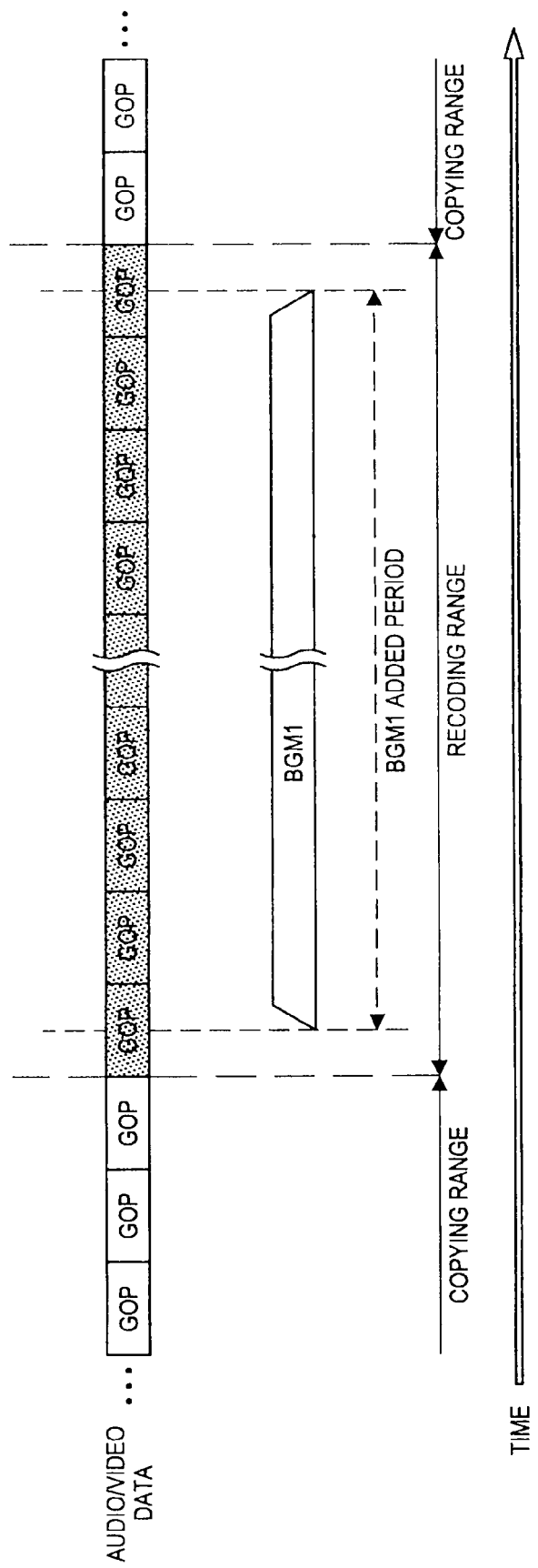
FIG. 12 is a diagram showing the range of recoding when output data according to the present embodiment is produced.

Further, the first to fourth embodiments have an advantage that original images can be saved without being destroyed and dynamic images in the original state without BGM can easily reproduced because original images have only BGM metadata added without being edited. On the other hand, there is an issue that it is difficult to obtain similar reproduction results by ordinary reproducing apparatuses that do not support BGM metadata. Thus, the control unit 140 may cause the storage unit 110 to store audio/video synthesis data obtained by the audio/video synthesis unit 170. That is, if the superimposition/separation unit 280 and the recording/reproducing unit 290 have sufficient throughput capacity to decode dynamic images and simultaneously to encode and record BGM added results in a memory card, optical disk or the like, processing shown below may be performed: As shown in FIG. 12, original dynamic images are copied in units of GOP (Group Of Pictures) and when an interval to which BGM should be added comes, processing to decode video, add BGM and encode the video is performed and after the interval ends, original dynamic images are again copied in units of GOP. Accordingly, copies of dynamic images in a state in which BGM is added while degradation of video and audio are minimized. By recording and producing copied dynamic images in the state in a removable medium such as a memory card and optical disk, video after editing to add BGM being performed can be reproduced to take pleasure in viewing the video even in an ordinary reproducing apparatus.

New content to which BGM is added can be created on the basis of non-destructive editing to which BGM is added and simultaneously by audio recoding and video copying.

It is also possible to leave image video editing results behind as a production by recording BGM on a different track from that of the original audio while original images and audio being saved. In this case, for example, original images may be recorded by associating with a plurality of audios (original audio, BGM and the like) so that the audio selected by the user among the plurality of audios is output during reproduction.

In the first to fourth embodiments, the face detection unit 143 and the music detection unit 142 may be configured as hardware or software on an MPU (Micro Processor Unit) or DSP (Digital Signal Processor) and thus may be configured by a method optimal to the system.

In the third and fourth embodiments, the present invention is configured by taking an imaging apparatus such as a video camera recorder as an example, but embodiments of the present invention are not limited to this and are applicable to apparatuses in general capable of dealing with dynamic images such as a personal computer, VTR, HDD recorder, video editing apparatus, digital still camera with a dynamic image function, and mobile phone with a dynamic image shooting function.

The present application contains subject matter related to that disclosed in Japanese Priority Patent Application JP 2008-290175 filed in the Japan Patent Office on Nov. 12, 2008, the entire content of which is hereby incorporated by reference.

What is claimed is:

1. An information processing apparatus, comprising:
a storage unit that stores object metadata created by associating object present time information indicating a time when an object is present in video of audio/video data with object identification information to identify the object present in the video, music metadata containing music present time information indicating the time when music is present in audio of the audio/video data, and object background music (BGM) correspondence information created by associating the object identification information with BGM identification information; and
a control unit that determines whether any time in the audio/video data satisfies a first condition in which a time in the audio/video data matches a time indicated by the object present time information and determines whether the time in the audio/video data also satisfies a second condition in which the time in the audio/video data does not match a time in the music present time information in which the music is present in the audio of the audio/video data, and
if the time in the audio/video data satisfies the first and second conditions, the control unit automatically outputs BGM identified by the BGM identification information associated with the object identification information associated with the object present time information when reproduction advances to the time concerned.

2. The information processing apparatus according to claim 1, wherein
the storage unit further stores the audio/video data, and the information processing apparatus further includes:
a BGM data storage unit that stores BGM data;
a reproducing unit that reproduces the audio/video data stored in the storage unit;
a separation unit that obtains audio data and video data by separating the audio/video data reproduced by the reproducing unit;
an audio synthesis unit that obtains synthetic audio data by synthesizing the BGM data identified by the BGM identification information and the audio data obtained by the separation unit when the reproduction advances to the time decided by the control unit to output the BGM; and
an audio/video synthesis unit that obtains audio/video synthesis data by synthesizing the synthetic audio data obtained by the audio synthesis unit and the video data.

3. The information processing apparatus according to claim 1, wherein
the control unit includes:
a BGM metadata generation unit that generates BGM metadata by associating BGM present time information indicating the time decided to output the BGM and the BGM identification information and causes the storage unit to store the BGM metadata.

4. The information processing apparatus according to claim 3, wherein
the storage unit further stores the audio/video data, and the information processing apparatus further includes:
a BGM data storage unit that stores BGM data;
a reproducing unit that reproduces the audio/video data stored in the storage unit;
a separation unit that obtains audio data and video data by separating the audio/video data reproduced by the reproducing unit;
an audio synthesis unit that obtains synthetic audio data by synthesizing the BGM data identified by the BGM identification information and the audio data obtained by the separation unit when the reproduction advances to the time indicated by the BGM present time information of the BGM metadata stored in the storage unit; and
an audio/video synthesis unit that obtains audio/video synthesis data by synthesizing the synthetic audio data obtained by the audio synthesis unit and the video data.

5. The information processing apparatus according to claim 2, further comprising:
a video output unit that outputs video based on the video data contained in the audio/video synthesis data obtained by the audio/video synthesis unit; and
an audio output unit that outputs synthetic audio based on the synthetic audio data contained in the audio/video synthesis data obtained by the audio/video synthesis unit.

6. The information processing apparatus according to claim 2, further comprising:

an input unit configured to accept input of instruction information not to synthesize the BGM data and the audio data from a user, wherein the control unit does not cause the audio synthesis unit to synthesize the BGM data and the audio data when the input unit accepts the input of the instruction information from the user.

7. The information processing apparatus according to claim 2, wherein the control unit causes the storage unit to store the audio/video synthesis data obtained by the audio/video synthesis unit.

8. An information processing method, comprising:

storing, in a storage unit of an information processing apparatus, object metadata created by associating object present time information indicating a time when an object is present in video of audio/video data with object identification information to identify the object, music metadata containing music present time information indicating the time when music is present in audio of the audio/video data, and object background music (BGM) correspondence information created by associating the object identification information with BGM identification information; and determining, with a control unit of the information processing apparatus, whether any time in the audio/video data satisfies a first condition in which a time in the audio/video data matches a time indicated by the object present time information and determines whether the time in the audio/video data also satisfies a second condition in which the time in the audio/video data does not match a time in the music present time information in which the music is present in the audio of the audio/video data, and if the time in the audio/video data satisfies the first and second conditions, the control unit automatically outputs BGM identified by the BGM identification information associated with the object identification information associated with the object present time information when reproduction advances to the time concerned.

9. A non-transitory computer-readable storage medium storing computer readable instructions which when executed by a processor cause the processor to perform an information processing method comprising:

storing, in a storage unit, object metadata created by associating object present time information indicating a time when an object is present in video of audio/video data with object identification information to identify the object, music metadata containing music present time information indicating the time when music is present in audio of the audio/video data, and object background music (BGM) correspondence information created by associating the object identification information with BGM identification information; and determining, with a control unit, whether any time in the audio/video data satisfies a first condition in which a time in the audio/video data matches a time indicated by the object present time information and determines whether the time in the audio/video data also satisfies a second condition in which the time in the audio/video data does not match a time in the music present time information in which the music is present in the audio of the audio/video data, and if the time in the audio/video data satisfies satisfying the first and second conditions, the control unit automatically outputs BGM identified by the BGM identification information associated with the object identification information associated with the object present time information when reproduction advances to the time concerned.

10. An imaging apparatus, comprising:

a storage unit that stores object metadata created by associating object present time information indicating a time when an object is present in video of audio/video data with object identification information to identify the object, music metadata containing music present time information indicating the time when music is present in audio of the audio/video data, and object background music (BGM) correspondence information created by associating the object identification information with BGM identification information; and a control unit that determines whether any time in the audio/video data satisfies a first condition in which a time in the audio/video data matches a time indicated by the object present time information and determines whether the time in the audio/video data also satisfies a second condition in which the time in the audio/video data does not match a time in the music present time information in which the music is present in the audio of the audio/video data, and if the time in the audio/video data satisfies the first and second conditions, the control unit automatically outputs BGM identified by the BGM identification information associated with the object identification information associated with the object present time information when reproduction advances to the time concerned.

* * * * *